US012645684B2

(12) United States Patent
Khandelwal et al.

(10) Patent No.: US 12,645,684 B2
(45) Date of Patent: Jun. 2, 2026

(54) AUTOMATED KEYWORD GENERATION BASED ON SIMILARITY SCORE

(71) Applicant: Google LLC, Mountain View, CA (US)

(72) Inventors: Abhinav Khandelwal, Karnataka (IN); Aravindan Raghuveer, Bangalore (IN); Snehal Sunilkumar Motarwar, Karnataka (IN); Rishi Saket, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/774,775

(22) Filed: Jul. 16, 2024

(65) Prior Publication Data

US 2025/0110962 A1      Apr. 3, 2025

(51) Int. Cl.
G06F 16/2457 (2019.01)
G06F 16/9538 (2019.01)

(52) U.S. Cl.
CPC .... G06F 16/24578 (2019.01); G06F 16/9538 (2019.01)

(58) Field of Classification Search
CPC ..................... G06F 16/24578; G06F 16/9538
See application file for complete search history.

(56) References Cited

U.S. PATENT DOCUMENTS

| | | | |
|---|---|---|---|
| 8,180,760 B1 * | 5/2012 | Carver | G06F 16/355 |
| | | | 707/708 |
| 2011/0035276 A1 * | 2/2011 | Ghosh | G06Q 30/02 |
| | | | 705/14.46 |
| 2012/0158527 A1 * | 6/2012 | Cannelongo | H04N 21/2668 |
| | | | 707/748 |
| 2015/0248484 A1 * | 9/2015 | Yu | G06F 16/9535 |
| | | | 707/711 |
| 2021/0152866 A1 * | 5/2021 | El Essaili | H04N 21/4884 |
| 2024/0311428 A1 * | 9/2024 | Qian | G06F 16/90344 |

* cited by examiner

*Primary Examiner* — Jay A Morrison
(74) *Attorney, Agent, or Firm* — DORITY & MANNING P.A.

(57) ABSTRACT

Methods, computing systems, and technology for generating keywords using machine-learned techniques. The system can receive, from a user device, a first keyword associated with a content item of a first content provider. Additionally, the system can access from a keyword database, a plurality of keywords. Moreover, the system can select, using the machine-learned model, a subset of keywords from the plurality of keywords based on the content item. Furthermore, the system can process, using a machine-learned model, the first keyword and a subset of keywords to calculate a similarity score for each keyword in the subset of keywords and the first keyword. The system can determine a suggested keyword from the subset of keywords based on the similarity score for each keyword in the subset of keywords and the first keyword. Subsequently, the system can cause, on a display of the user device, a presentation of the suggested keyword.

19 Claims, 14 Drawing Sheets

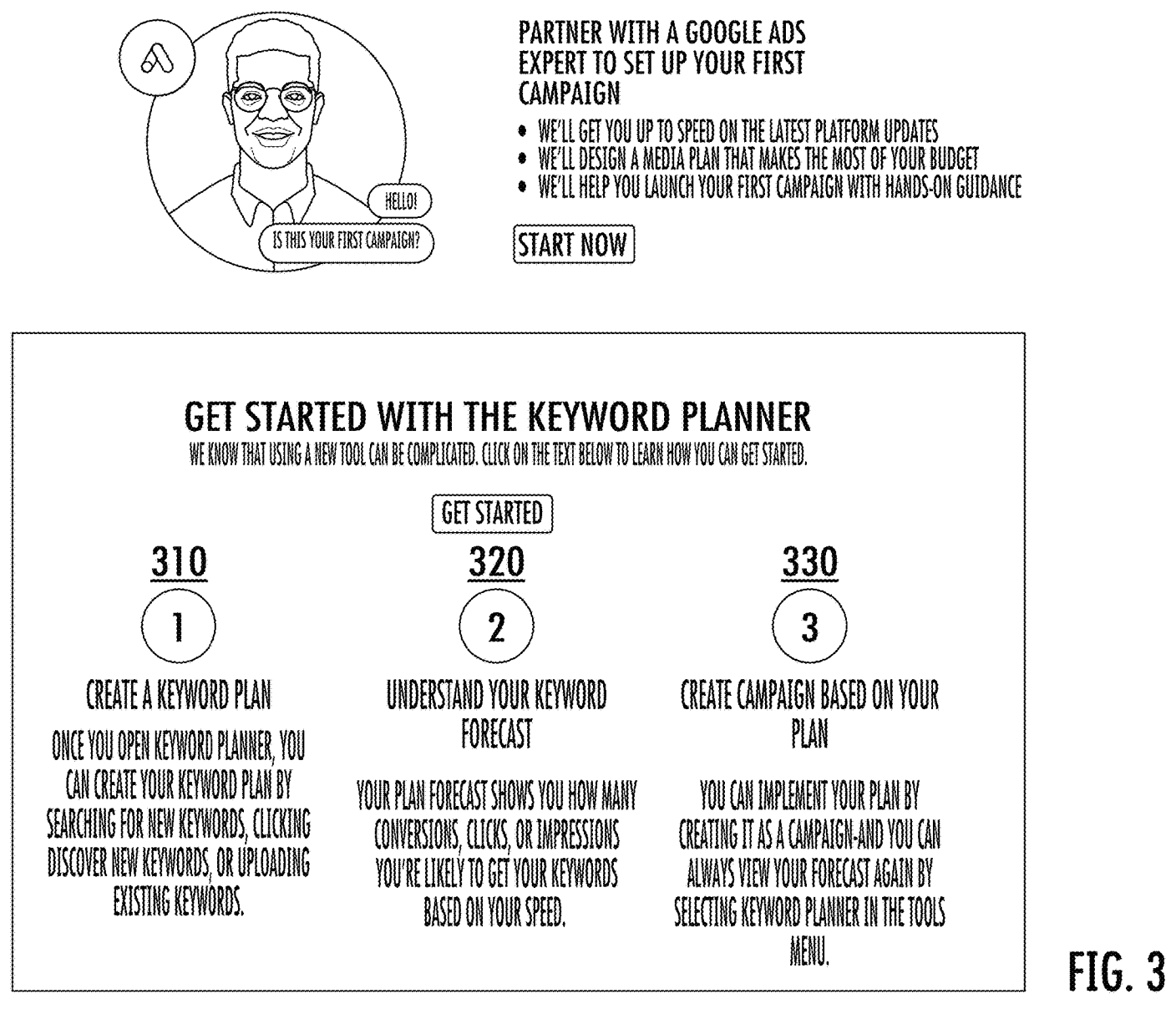

HELLO!

IS THIS YOUR FIRST CAMPAIGN?

PARTNER WITH A GOOGLE ADS EXPERT TO SET UP YOUR FIRST CAMPAIGN

- WE'LL GET YOU UP TO SPEED ON THE LATEST PLATFORM UPDATES
- WE'LL DESIGN A MEDIA PLAN THAT MAKES THE MOST OF YOUR BUDGET
- WE'LL HELP YOU LAUNCH YOUR FIRST CAMPAIGN WITH HANDS-ON GUIDANCE

START NOW

GET STARTED WITH THE KEYWORD PLANNER

WE KNOW THAT USING A NEW TOOL CAN BE COMPLICATED. CLICK ON THE TEXT BELOW TO LEARN HOW YOU CAN GET STARTED.

310

1

CREATE A KEYWORD PLAN

ONCE YOU OPEN KEYWORD PLANNER, YOU CAN CREATE YOUR KEYWORD PLAN BY SEARCHING FOR NEW KEYWORDS, CLICKING DISCOVER NEW KEYWORDS, OR UPLOADING EXISTING KEYWORDS.

GET STARTED

320

2

UNDERSTAND YOUR KEYWORD FORECAST

YOUR PLAN FORECAST SHOWS YOU HOW MANY CONVERSIONS, CLICKS, OR IMPRESSIONS YOU'RE LIKELY TO GET YOUR KEYWORDS BASED ON YOUR SPEED.

330

3

CREATE CAMPAIGN BASED ON YOUR PLAN

YOU CAN IMPLEMENT YOUR PLAN BY CREATING IT AS A CAMPAIGN-AND YOU CAN ALWAYS VIEW YOUR FORECAST AGAIN BY SELECTING KEYWORD PLANNER IN THE TOOLS MENU.

FIG. 3

NEW CAMPAIGN       <u>400</u>

ADD KEYWORD THEMES TO MATCH YOUR AD TO SEARCHES

SELECTED KEYWORD THEMES:   <u>410</u>

( LAW FIRM × )   ( CIVIL LAW FIRM × )   ( BUSINESS LAW FIRM × )

( REAL ESTATE LAW FIRM × )   ( DISABILITY LAW FIRM × )   ( BANKRUPTCY LAWYER × )

+ NEW KEYWORD THEME:

SELECTED KEYWORD THEMES:   <u>420</u>

( + LEGAL FIRM )   ( + LAWYER FIRM )   ( + PATENT ATTORNEY )

( + IP LAW FIRMS )   ( + PATENT LAW FIRMS )   ( + IP LAWYER )

( + PATENT LAWYER )   ( + LEADING IP FIRM )   ( + PATENT LITIGATIONS )

( + PATENT LAW ISSUES )   ( + PERSONAL INJURY LAW FIRM )

( + ESTATE PLANNING LAW FIRM )   ( + TENANT LANDLORD LAW FIRM )

( + FAMILY LAW FIRM )   ( + IMMIGRATION LAW FIRM )

CLUSTER BASED KEYWORD CONVERSION VALUE
METHOD (I) ADSGO KEYWORDS, ADSGO IMPRESSIONS

500

METHOD (II) ADSGO KEYWORDS, ALL ADVT IMPRESSIONS

700

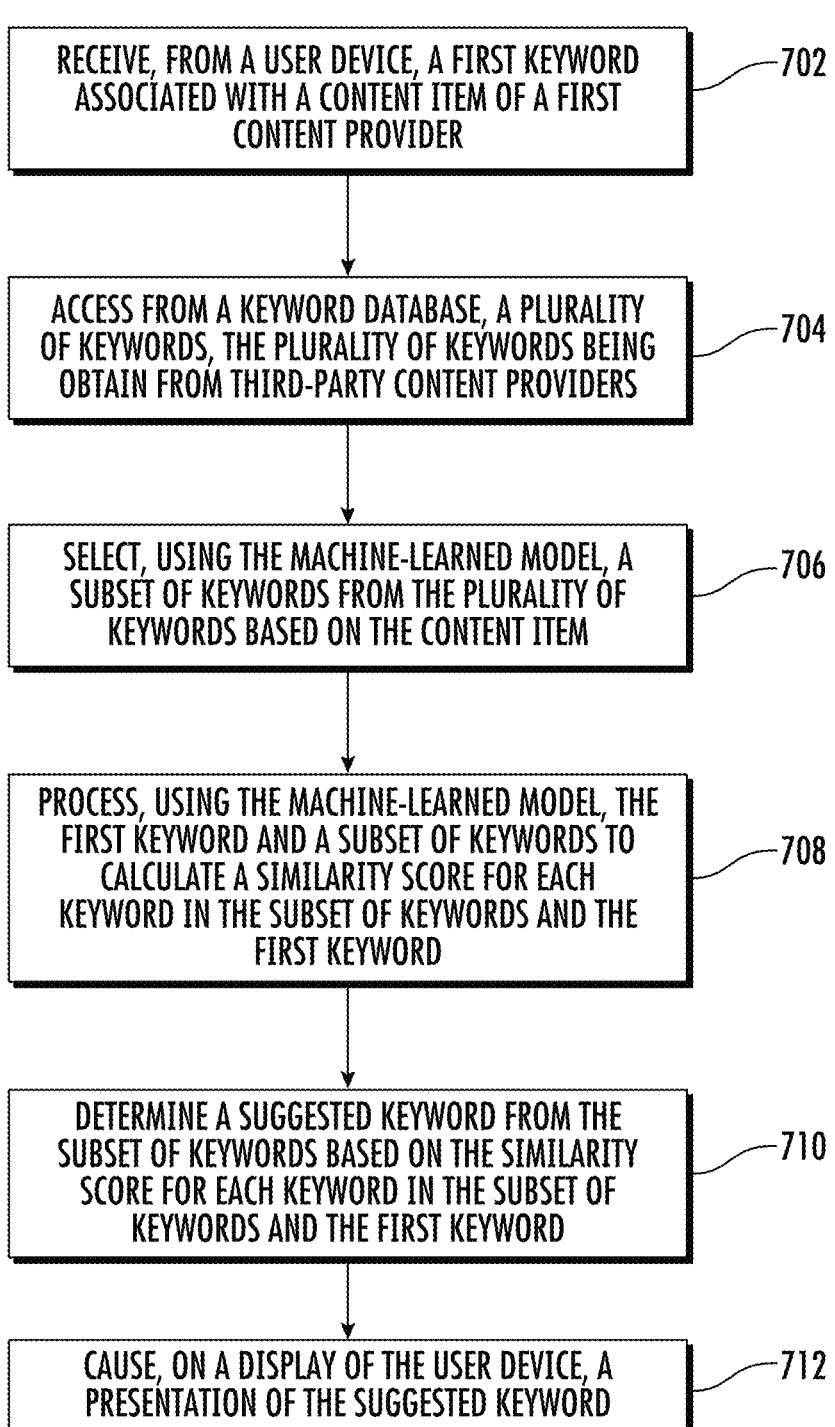

RECEIVE, FROM A USER DEVICE, A FIRST KEYWORD ASSOCIATED WITH A CONTENT ITEM OF A FIRST CONTENT PROVIDER ⎯702

ACCESS FROM A KEYWORD DATABASE, A PLURALITY OF KEYWORDS, THE PLURALITY OF KEYWORDS BEING OBTAIN FROM THIRD-PARTY CONTENT PROVIDERS ⎯704

SELECT, USING THE MACHINE-LEARNED MODEL, A SUBSET OF KEYWORDS FROM THE PLURALITY OF KEYWORDS BASED ON THE CONTENT ITEM ⎯706

PROCESS, USING THE MACHINE-LEARNED MODEL, THE FIRST KEYWORD AND A SUBSET OF KEYWORDS TO CALCULATE A SIMILARITY SCORE FOR EACH KEYWORD IN THE SUBSET OF KEYWORDS AND THE FIRST KEYWORD ⎯708

DETERMINE A SUGGESTED KEYWORD FROM THE SUBSET OF KEYWORDS BASED ON THE SIMILARITY SCORE FOR EACH KEYWORD IN THE SUBSET OF KEYWORDS AND THE FIRST KEYWORD ⎯710

CAUSE, ON A DISPLAY OF THE USER DEVICE, A PRESENTATION OF THE SUGGESTED KEYWORD ⎯712

FIG. 7

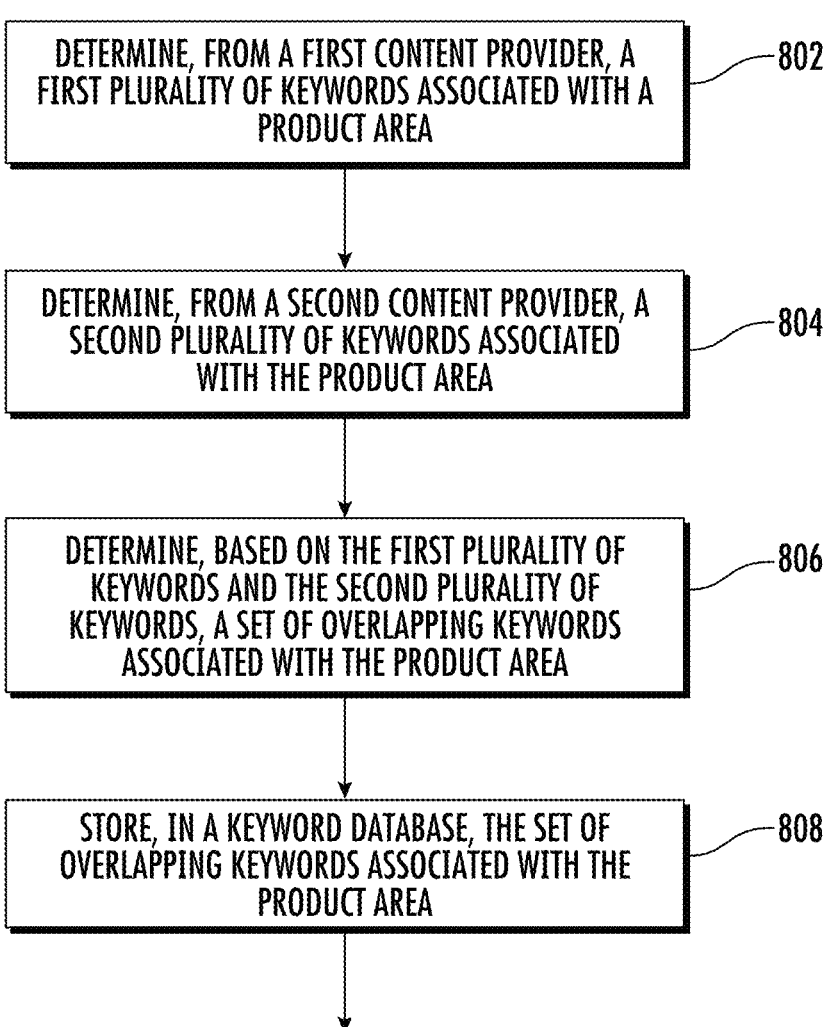

800

DETERMINE, FROM A FIRST CONTENT PROVIDER, A FIRST PLURALITY OF KEYWORDS ASSOCIATED WITH A PRODUCT AREA — 802

DETERMINE, FROM A SECOND CONTENT PROVIDER, A SECOND PLURALITY OF KEYWORDS ASSOCIATED WITH THE PRODUCT AREA — 804

DETERMINE, BASED ON THE FIRST PLURALITY OF KEYWORDS AND THE SECOND PLURALITY OF KEYWORDS, A SET OF OVERLAPPING KEYWORDS ASSOCIATED WITH THE PRODUCT AREA — 806

STORE, IN A KEYWORD DATABASE, THE SET OF OVERLAPPING KEYWORDS ASSOCIATED WITH THE PRODUCT AREA — 808

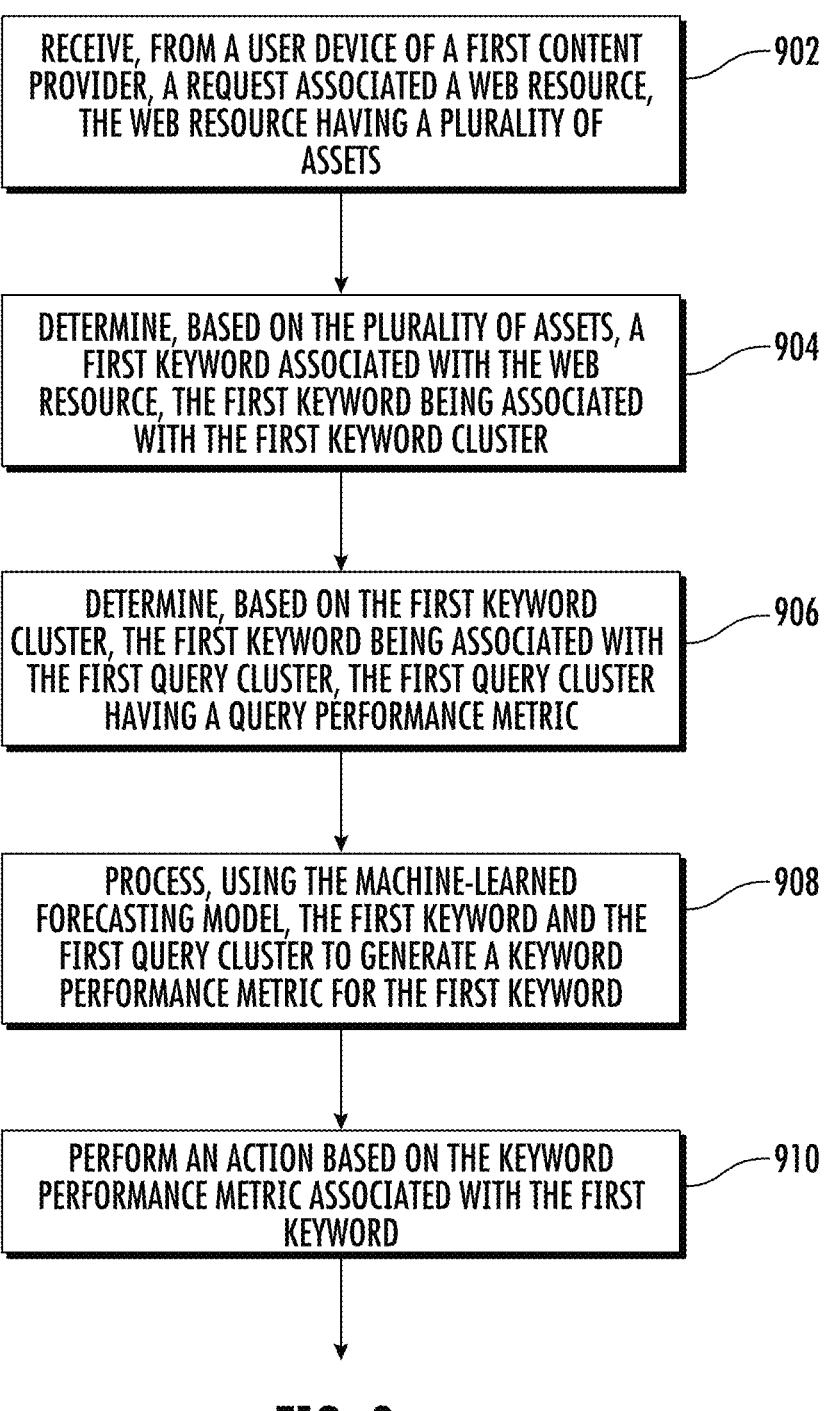

RECEIVE, FROM A USER DEVICE OF A FIRST CONTENT PROVIDER, A REQUEST ASSOCIATED A WEB RESOURCE, THE WEB RESOURCE HAVING A PLURALITY OF ASSETS — 902

DETERMINE, BASED ON THE PLURALITY OF ASSETS, A FIRST KEYWORD ASSOCIATED WITH THE WEB RESOURCE, THE FIRST KEYWORD BEING ASSOCIATED WITH THE FIRST KEYWORD CLUSTER — 904

DETERMINE, BASED ON THE FIRST KEYWORD CLUSTER, THE FIRST KEYWORD BEING ASSOCIATED WITH THE FIRST QUERY CLUSTER, THE FIRST QUERY CLUSTER HAVING A QUERY PERFORMANCE METRIC — 906

PROCESS, USING THE MACHINE-LEARNED FORECASTING MODEL, THE FIRST KEYWORD AND THE FIRST QUERY CLUSTER TO GENERATE A KEYWORD PERFORMANCE METRIC FOR THE FIRST KEYWORD — 908

PERFORM AN ACTION BASED ON THE KEYWORD PERFORMANCE METRIC ASSOCIATED WITH THE FIRST KEYWORD — 910

FIG. 9

AUTOMATED KEYWORD GENERATION BASED ON SIMILARITY SCORE

PRIORITY CLAIM

The present application is based on and claims priority to Indian Provisional Application IN202321065496 having a filing date of Sep. 29, 2023, which is incorporated by reference herein.

FIELD

The present disclosure relates generally to using machine-learned models to generate keywords for a web resource and automate content presentation based on the generated keywords. More particularly, the present disclosure relates to using machine-learning techniques for assessing data associated with a content provider and generating keywords that are relevant to the products and services of the content provider.

BACKGROUND

Keywords play a critical role in connecting users with the content, products, or services that users are looking for online. Effective keyword selection and optimization are vital for a successful campaign by a content provider, as it can determine whether a content item of the content provider is visible to the target audience.

A keyword is a term or phrase that represents a significant word or concept in a piece of content, such as a document, webpage, or digital content item. In the context of product marketing or service marketing, a content provider can select keywords that are relevant to their products or services. When users search for those keywords, a content item associated with the content provider may be displayed alongside the search results. In the context of digital search, keywords are primarily associated with search engine optimization, where content providers use keywords to optimize their content (e.g., webpage) for search engines. By including relevant keywords in their content, the content provider aims to make it easier for users to find their content.

Content item targeting based on keywords is a digital strategy where content providers select specific keywords relevant to their products or services. When users search for or engage with content related to these keywords, a search platform can conduct real-time auctions to determine which content item to display.

SUMMARY

Aspects and advantages of embodiments of the present disclosure will be set forth in part in the following description, or can be learned from the description, or can be learned through practice of the embodiments.

One example aspect of the present disclosure is directed to a computing system for using machine-learned techniques for determining a keyword for a web resource. The system can include one or more processors and one or more non-transitory computer-readable media. The computer-readable media can collectively store a machine-learned model configured to generate keywords and instructions that, when executed by the one or more processors, cause the computing system to perform operations. The operations can include receiving, from a user device, a first keyword associated with a content item of a first content provider. The operations can include accessing from a keyword database, a plurality of keywords. The plurality of keywords can be obtained from third-party content providers. The operations can include selecting, using the machine-learned model, a subset of keywords from the plurality of keywords based on the content item. The operations can include processing, using the machine-learned model, the first keyword and a subset of keywords to calculate a similarity score for each keyword in the subset of keywords and the first keyword. The operations can include determining a suggested keyword from the subset of keywords based on the similarity score for each keyword in the subset of keywords and the first keyword. The operations can include causing, on a display of the user device, a presentation of the suggested keyword.

In some instances, the system can include a keyword database that stores keyword data. The keyword data includes the plurality of keywords (e.g., keyword cluster). Additionally, in order for a keyword to be included in the plurality of keywords, the keyword has to have been used in a campaign by a number of third-party content providers that exceeds a threshold value (e.g., 50).

In some instances, the operations can further include extracting content data from a landing page of the first content provider. The subset of keywords is further selected from the plurality of keywords based on the content data.

In some instances, the subset of keywords can be further selected from the plurality of keywords based on the first keyword.

In some instances, the similarity score can be calculated using a sum of squared (SQM) nearest-neighbor technique.

In some instances, the similarity score can be calculated using a cosine similarity technique.

In some instances, the similarity score can be calculated using a Jaccard similarity technique.

In some instances, the similarity score can be calculated using a quotient kinematics machines (QKMs) similarity technique.

In some instances, the similarity score can be calculated using a Quantum Bayesianism similarity technique.

In some instances, the similarity score can be calculated based on a number of overlapping keywords, the overlapping keywords being used by both the first content provider and the third-party content providers.

In some instances, the content item can be a product, and/or a service.

In some instances, the operations can further include determining a return on investment value for each keyword in the subset of keywords. Additionally, the suggested keyword can be further determined based on the return on investment value of each keyword in the subset of keywords.

Another example aspect of the present disclosure is directed to a computer-implemented method for determining a suggested keyword. The method can include receiving, from a user device, a first keyword associated with a content item of a first content provider. Additionally, the method can include accessing from a keyword database, a plurality of keywords, the plurality of keywords being obtained from third-party content providers. Moreover, the method can include selecting, using a machine-learned model, a subset of keywords from the plurality of keywords based on the content item. Furthermore, the method can include processing, using the machine-learned model, the first keyword and a subset of keywords to calculate a similarity score for each keyword in the subset of keywords and the first keyword. The method can include determining a suggested keyword from the subset of keywords based on the similarity score for each keyword in the subset of keywords and the first keyword. Subsequently, the method can include causing, on a display of the user device, a presentation of the suggested keyword.

In some instances, the method can include storing the plurality of keywords in a keyword database, wherein each keyword in the plurality of keywords has been used by a number of third-party content providers that exceeds a threshold value.

In some instances, the method can include extracting content data from a landing page of the first content provider. The subset of keywords can be further selected from the plurality of keywords based on the content data.

In some instances, the subset of keywords can be further selected from the plurality of keywords based on the first keyword.

In some instances, the similarity score can be calculated using a sum of squared (SQM) nearest-neighbor technique, a cosine similarity technique, a Jaccard similarity technique, a quotient kinematics machines (QKMs) similarity technique, or a Quantum Bayesianism similarity technique.

Another example aspect of the present disclosure is directed to one or more non-transitory, computer readable media storing instructions that are executable by one or more processors to cause a computing system to perform operations. The operations can include receiving, from a user device, a first keyword associated with a content item of a first content provider. The operations can include accessing from a keyword database, a plurality of keywords. The plurality of keywords can be obtained from third-party content providers. The operations can include selecting, using the machine-learned model, a subset of keywords from the plurality of keywords based on the content item. The operations can include processing, using the machine-learned model, the first keyword and a subset of keywords to calculate a similarity score for each keyword in the subset of keywords and the first keyword. The operations can include determining a suggested keyword from the subset of keywords based on the similarity score for each keyword in the subset of keywords and the first keyword. The operations can include causing, on a display of the user device, a presentation of the suggested keyword.

Another example aspect of the present disclosure is directed to a computer-implemented method for generating a keyword database. The method can include determining, from a first content provider, a first plurality of keywords associated with a product area. Additionally, the method can include determining, from a second content provider, a second plurality of keywords associated with the product area. Moreover, the method can include determining, based on the first plurality of keywords and the second plurality of keywords, a set of overlapping keywords associated with the product area. Furthermore, the method can include storing, in a keyword database, the set of overlapping keywords associated with the product area.

One example aspect of the present disclosure is directed to a computing system for using machine-learned techniques for determining a keyword for a web resource, and automating content presentation for the web resource. The system can include one or more processors and one or more non-transitory computer-readable media that collectively store a keyword database, a machine-learned forecasting model, and instructions. The keyword database can store a plurality of keyword clusters, where a first keyword cluster in the plurality of keyword clusters is associated with a first query cluster that includes a plurality of queries that are semantically similar to a first intent. The machine-learned forecasting model can be configured to forecast keyword performance. The instructions that, when executed by the one or more processors, cause the computing system to perform operations. The operations can include receiving, from a user device of a first content provider, a request associated with a web resource. The web resource can have a plurality of assets. The operations can further include determining, based on the plurality of assets, a first keyword associated with the web resource. The first keyword can be associated with the first keyword cluster. The operations can include determining, based on the first keyword cluster, the first keyword being associated with the first query cluster. The first query cluster can have a query performance metric. The operations can include processing, using the machine-learned forecasting model, the first keyword and the first query cluster to generate a keyword performance metric for the first keyword. The operations can include performing an action based on the keyword performance metric associated with the first keyword.

In some instances, the computing system can further include a database storing a plurality of query clusters. The plurality of query clusters can include the first query cluster. The first query cluster can be associated with a query performance metric.

In some instances, the query performance metric can be derived from performance of content items that are presented in response to the first intent. In some instances, the content items are associated with content providers that are different from the first content provider.

In some instances, the keyword performance metric can be generated based on a query performance metric of the first query cluster.

In some instances, the operations further include extracting the plurality of assets from the web resource. Additionally, the system can process, using a machine-learned keyword model, the plurality of assets to generate the first keyword.

In some instances, the request includes a received keyword that is received from the first content provider, and the operations further include processing, using a machine-learned keyword model, the received keyword and the plurality of assets to generate the first keyword. The first keyword can be different from the received keyword. In some instances, a return on investment value of the keyword performance metric associated with the first keyword is higher than a return on investment value associated with the received keyword.

In some instances, the operations can further include processing, using a machine-learned keyword model, the first keyword to determine that the first keyword is associated with the first keyword cluster.

In some instances, the first keyword can be determined to be associated with the first query cluster based on the first keyword cluster being associated with the first query cluster.

In some instances, the action can include generating a campaign plan for presenting a content item in response to a query associated with the first intent.

In some instances, the action can include a suggestion to modify a bid amount for presenting a content item in response to the first keyword.

In some instances, the keyword performance metric for the first keyword can include a conversion rate metric for the first keyword.

In some instances, the query performance metric can include a conversion rate for a plurality of queries in the first query cluster. The conversion rate metric for the first keyword can be an average, a median, or a maximum of the conversion rate for the plurality of queries.

In some instances, the first keyword is associated with a second query cluster having a second query performance metric. The keyword performance metric can be calculated by taking a weighted sum of the query performance metric and the second performance metric.

In some instances, the system can include a keyword database that stores a plurality of keyword clusters. The plurality of keyword clusters can include the first keyword cluster. Additionally, each keyword in the first keyword cluster has been used by a number of third-party content providers that exceeds a threshold value (e.g., 50).

In some instances, the operations further include determining, based on the plurality of assets, the first keyword cluster. Additionally, the operations can include determining a return on investment value for each keyword in the first keyword cluster. Moreover, the first keyword can be further determined based on the return on investment value of each keyword in the first keyword cluster.

Another example aspect of the present disclosure is directed to a computer-implemented method for using machine-learned techniques for determining a keyword for a web resource, and automating content presentation for the web resource. The method can include receiving, from a user device of a first content provider, a request associated with a web resource. The web resource can have a plurality of assets. The method can include receiving, from a user device of a first content provider, a request associated with a web resource. The web resource can have a plurality of assets. The method can further include determining, based on the plurality of assets, a first keyword associated with the web resource. The first keyword can be associated with the first keyword cluster. The method can include determining, based on the first keyword cluster, the first keyword being associated with the first query cluster. The first query cluster can have a query performance metric. The method can include processing, using the machine-learned forecasting model, the first keyword and the first query cluster to generate a keyword performance metric for the first keyword. The method can include performing an action based on the keyword performance metric associated with the first keyword.

In some instances, the method can include accessing, from a keyword database storing a plurality of keyword clusters, the first keyword cluster from the plurality of keyword clusters. The first keyword cluster can be associated with a first query cluster that includes a plurality of queries that are semantically similar to a first intent.

In some instances, the method can include accessing, from a query database storing a plurality of query clusters, the first query cluster. The first query cluster can be associated with a query performance metric.

Another example aspect of the present disclosure is directed to one or more non-transitory, computer readable media for using machine-learned techniques for determining a keyword for a web resource, and automating content presentation for the web resource. The computer readable media stores instructions that are executable by one or more processors to cause a computing system to perform operations. The operations can include receiving, from a user device of a first content provider, a request associated with a web resource. The web resource can have a plurality of assets. The operations can further include determining, based on the plurality of assets, a first keyword associated with the web resource. The first keyword can be associated with the first keyword cluster. The operations can include determining, based on the first keyword cluster, the first keyword being associated with the first query cluster. The first query cluster can have a query performance metric. The operations can include processing, using the machine-learned forecasting model, the first keyword and the first query cluster to generate a keyword performance metric for the first keyword. The operations can include performing an action based on the keyword performance metric associated with the first keyword.

Another example embodiment is directed to a computer-implemented method. The method can include determining, from a first content provider, a first plurality of keywords associated with a product area. Additionally, the method can include determining, from a second content provider, a second plurality of keywords associated with the product area. Moreover, the method can include determining, based on the first plurality of keywords and the second plurality of keywords, a set of overlapping keywords associated with the product area. Furthermore the method can include storing, in a keyword database, the set of overlapping keywords associated with the product area.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3 depicts an example illustration of a graphical user interface for an entity to use a keyword planner according to example embodiments of the present disclosure.

FIG. 4 depicts an example illustration of a graphical user interface for presenting suggested keywords to an entity in the process of setting up a campaign.

FIG. 7 depicts a flow chart diagram of an example method for determining keywords for a web resource according to example embodiments of the present disclosure.

FIG. 8 depicts a flow chart diagram of an example method to determine keywords for a web resource according to example embodiments of the present disclosure.

FIG. 9 depicts a flow chart diagram of an example method for automating content presentation for the web resource based on a determined keyword according to example embodiments of the present disclosure.

Figure 1:
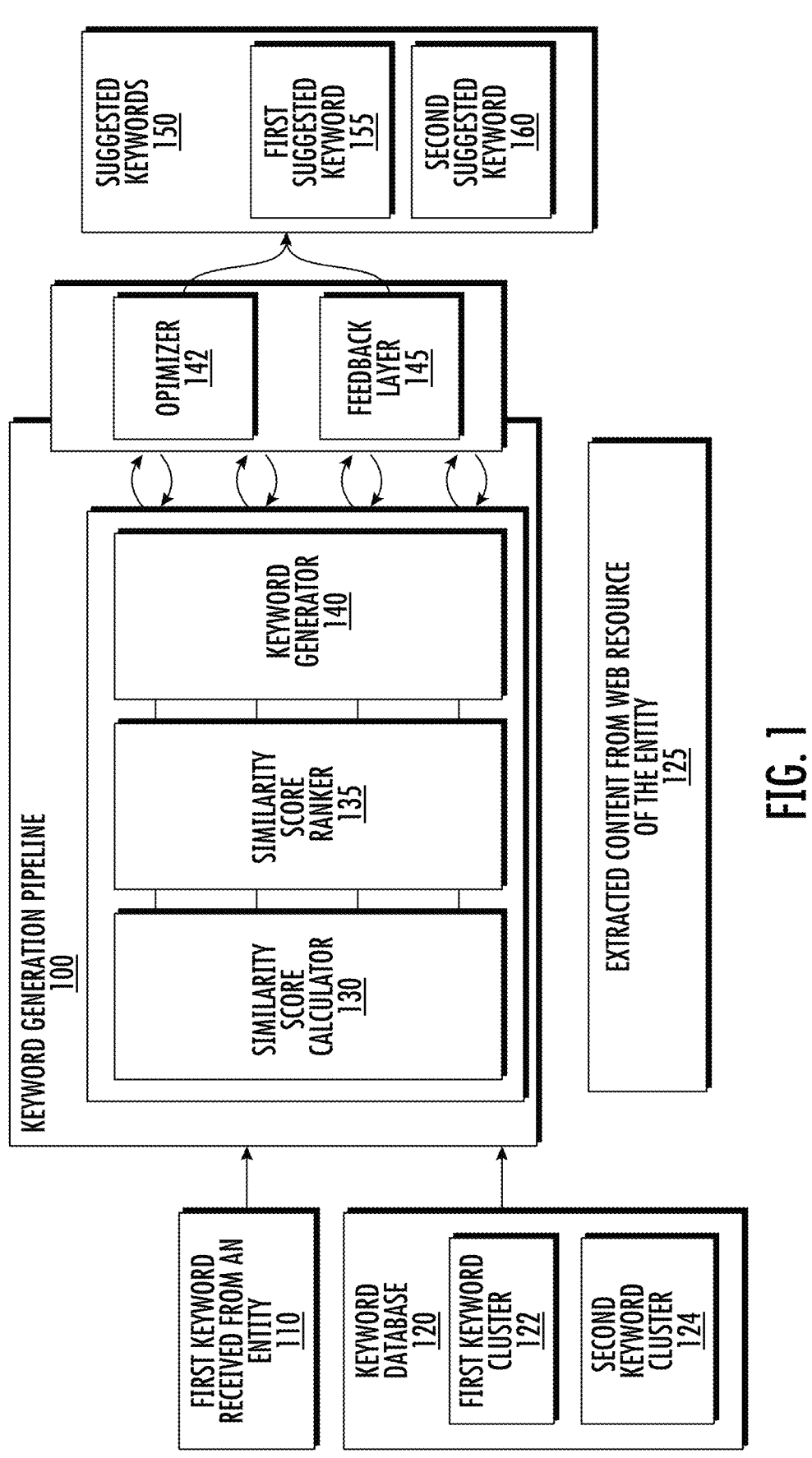
FIG. 1 depicts an example system for implementing a machine-learned keyword generation pipeline.

Reference numerals that are repeated across plural figures are intended to identify the same features in various implementations.

DETAILED DESCRIPTION

Overview

Generally, the present disclosure is directed to a keyword generation system having a machine-learned model to generate suggested keywords. The system described herein can present suggested keywords to an entity to improve performance of content presented on webpage or mobile application. In some instances, poor keyword selection can result in content items of the entity not reaching the targeted audience.

As background, a computer can execute instructions to generate outputs provided some input(s) according to a parameterized model. The computer can use an evaluation metric to evaluate its performance in generating the output with the model. The computer can update the parameters of the model based on the evaluation metric to improve its performance. In this manner, the computer can iteratively "learn" to generate the desired outputs. The resulting model is often referred to as a machine-learned (ML) model.

Content items can be shown based on keywords through a process called keyword targeting, which is commonly used in a search engine platform. For example, a content provider can set up a campaign. The content provider can create a campaign and specify keywords to target. The keywords can be selected based on their relevance to the products or services being marketed. In some instances, a search engine platform can conduct a keyword auction. For example, when a user enters a search query or visits a web page, the search platform can conduct a real-time auction to determine content to display. The auction can occur in a fraction of a second between the user's action and the loading of search results or webpage content. The search platform can perform a keyword matching by matching the keywords specified by a content provider with the user's search query, or the content of the webpage being visited. Additionally, a content provider can set a maximum amount for each keyword being targeted. Moreover, the search engine platform can perform a content ranking calculation for each content in the auction based on factors such as maximum amount, landing page quality, expected click-through rate, content relevance to keywork, and so on. The search engine platform can display the content item to the user. The content items with higher ranking are more likely to be displayed. In some instances, when multiple content providers are targeting the same keyword, the content item with the highest ranking gets presented. The search engine platform can determine the performance of a presented content item, including click-through rates, conversion rates, and return on investment.

Subsequently, content providers can adjust keywords, maximum amount, and landing pages to optimize the campaigns.

In conventional systems, suggested keywords can be determined from a query context. The suggested keywords can be generated based on a specific search query obtained from a user. These suggested keywords can be provided by search engines platforms to help content providers improve their content and search engine optimization strategies. For example, when a user enters a search query into a search engine, the search algorithm analyzes the query to understand the intent of the user. For content providers, suggested keywords can be valuable because the suggested keywords provide insights into what keywords and phrases are relevant to a particular topic. However, the suggested keywords in conventional systems are derived from user queries, instead of keywords obtained from other content providers, which may not provide optimal results for a content provider. For example, unlike users performing a search, content providers can select keywords to optimize performance (e.g., return on investment).

In conventional systems, estimation of keyword value for some entities (e.g., small business, non-large business) can rely on click metrics. Click metrics are used instead of conversion metrics because the conversion metrics signal may either be absent or very weak for entities with sparse datasets (e.g., small business, medium business). However, the click metrics do not accurately capture the value of keywords for entities with sparse datasets, as these entities may be more interested in conversions rather than clicks associated with the presentation of a content item.

According to some embodiments, techniques described herein enable a keyword based system to determine performance of a content item to predict how valuable a specific keyword can be. The keyword based system can utilize keyword cluster techniques to obtain additional information from other content providers in order to accurately capture the value of keywords, such as the click metrics of each keyword for an entity with sparse data.

In some instances, for a given vertical (e.g., product area, service area), the system can first create pairs of keywords based on the cluster of queries they match to, using semantic clustering of queries in that vertical. The cluster of queries can be pre-created by the system. The system can compute conversion rate metrics for each cluster and then derive the value of a keyword by taking a weighted sum of metrics corresponding to the clusters it is paired with.

Examples of the disclosure provide several technical effects, benefits, and/or improvements in computing technology and artificial intelligence techniques that involve the use of machine learning algorithms to generate new keywords. The techniques described herein improve the use of generative models by improving the quality of the generated content (e.g., keywords). The quality of the generated content is tailored specifically to the entity (e.g., company, user) by using data extracted from a web resource of the entity. For example, by using more content-relevant data, the system improves the performance of generative models. Additionally, the system utilizes better training techniques by developing more efficient and effective training techniques that are specific to the entity (e.g., based on data extracted from a web resource of the entity) to reduce the time and resources required to train models. Moreover, the system can incorporate user feedback and provide the feedback, via reinforcement learning or active learning, to generative models that can help the models learn from user preferences and improve over time. Furthermore, the present disclosure can reduce processing by reducing the number of manual inputs provided by a user and by reducing the number of interface screens which must be obtained, loaded, interacted with, and updated. For example, the user may only have to input a first keyword, and the system can automatically generate a plurality of suggested keywords based on the first keyword and extract content from the website of the user.

With reference now to the Figures, example embodiments of the present disclosure will be discussed in further detail.

FIG. 1 depicts an example system for implementing a machine-learned keyword generation pipeline 100. Machine-learned keyword generation pipeline 100 can include a similarity score 130 calculator. Machine-learned keyword generation pipeline 100 can include a similarity score ranker 135. Machine-learned keyword generation pipeline 100 can include a keyword generator 140 to generate suggested keywords 150. The suggested keywords can be a plurality of keywords such as a first suggest keyword 155 and a second suggest keyword 160.

Machine-learned keyword generation pipeline 100 can ingest data from a keyword database 120 and receive a first keyword 110 from an entity (e.g., content provider). Additionally, the machine-learned keyword generation pipeline 100 can extract content from a web resource (e.g., website, webpage) associated with the entity. Machine-learned keyword generation pipeline 100 can process the keyword database 120 and the first keyword to generate a similarity score 130.

Machine-learned keyword generation pipeline 100 can include one or more optimizer(s) 142 to apply one or more optimization algorithms to the outputs of any one or more of machine-learned generator models 130, 135, and 140.

Machine-learned keyword generation pipeline 100 can include a feedback layer 145. The feedback layer 145 can facilitate input of user feedback on suggested keywords. After selection, confirmation, or approval using the feedback layer 145, machine-learned keyword generation pipeline 100 can optimize the outputs of any one or more of machine-learned generator models 130, 135, and 140.

Figure 2:
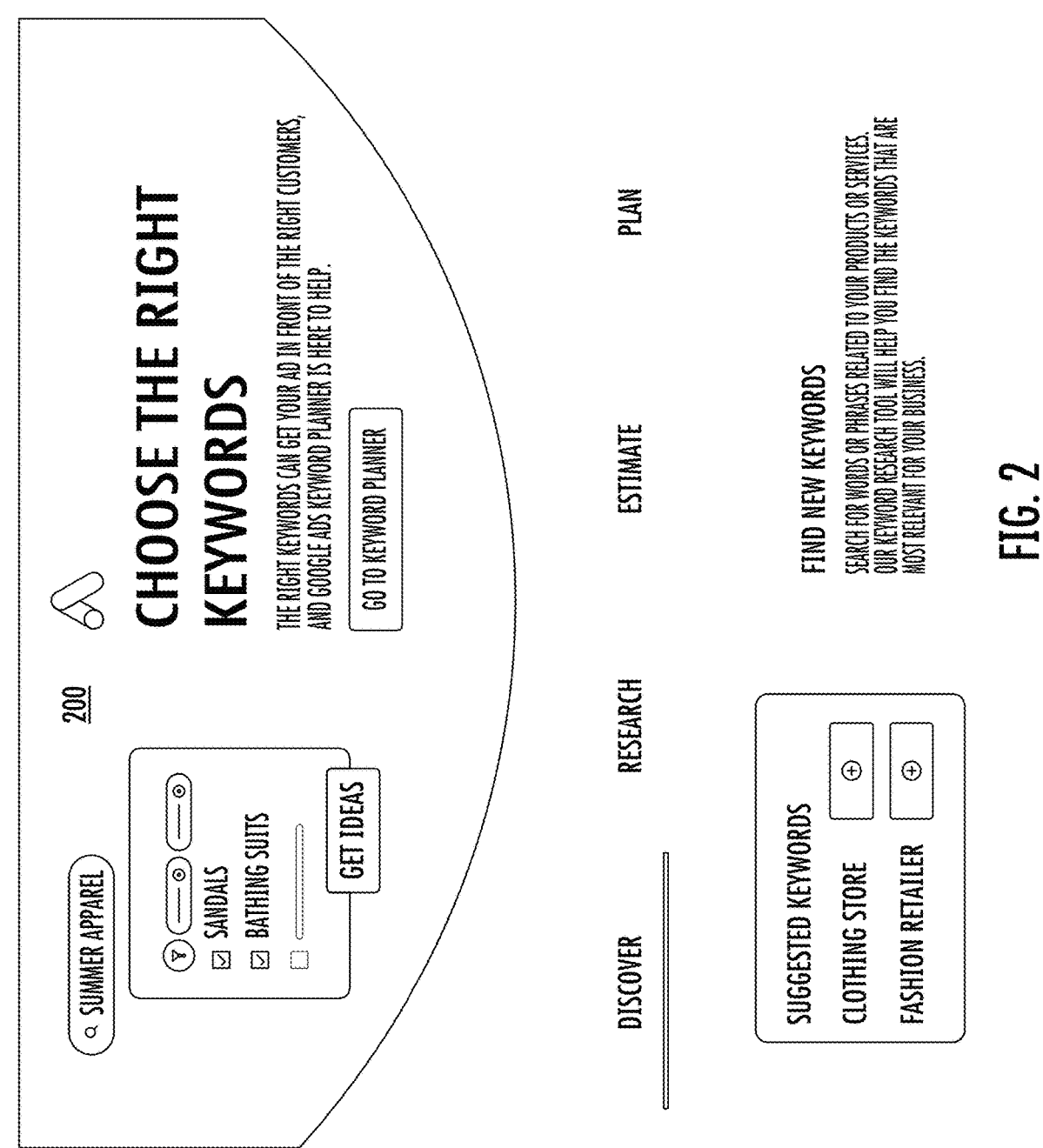
FIG. 2 depicts an example illustration of a graphical user interface for an entity to set up a campaign with suggested keywords according to example embodiments of the present disclosure.

FIG. 2 depicts an example illustration of a graphical user interface 200 for an entity to set up a campaign with suggested keywords according to example embodiments of the present disclosure.

FIG. 3 depicts an example illustration of a graphical user interface 300 for an entity to use a keyword planner 300 according to example embodiments of the present disclosure. The entity can create a keyword plan 310 by searching for new keywords, discovering new keywords, and uploading existing keywords. Additionally, the system can generate a plan forecast 320. The plan forecast can predict conversions, clicks, impressions associated with a keyword based on an amount of resources spent on the campaign. The system can automatically generate a campaign 330 based on the plan.

FIG. 4 depicts an example illustration of a graphical user interface 400 for presenting suggested keywords 410, 420 to an entity in the process of setting up a campaign according to example embodiments of the present disclosure.

Figure 5:
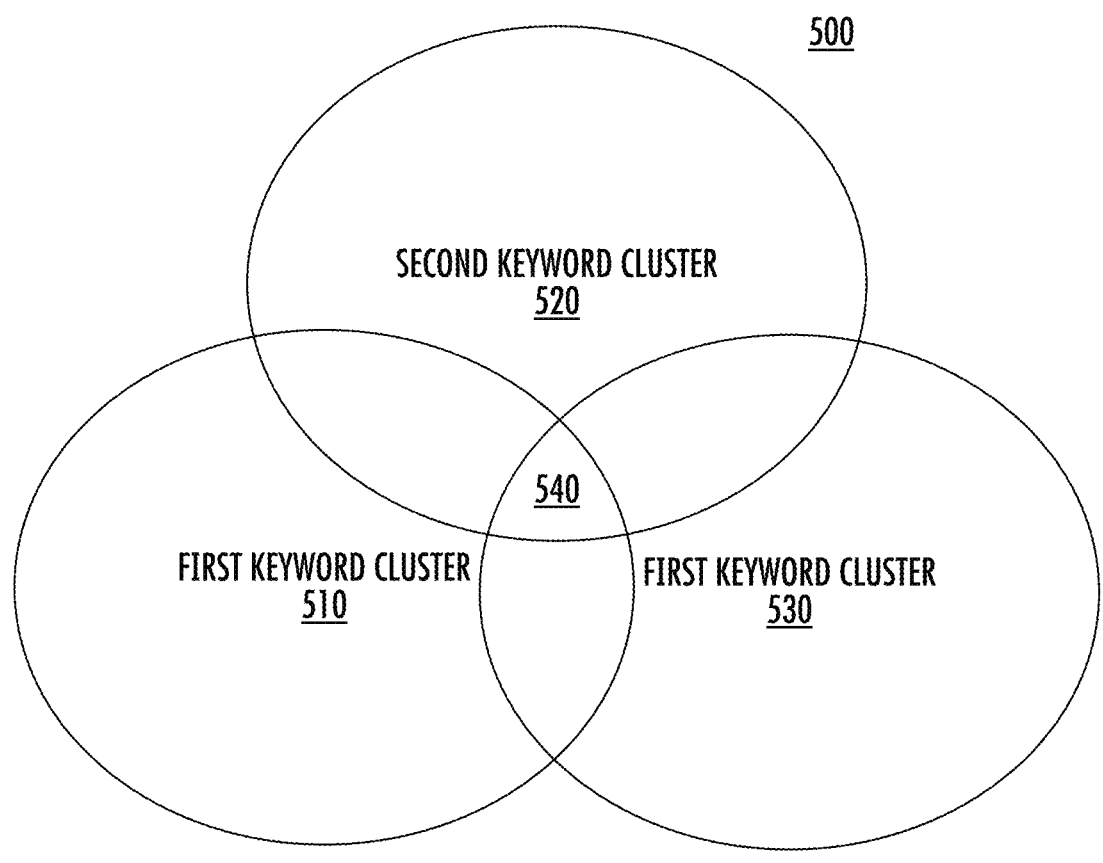
FIG. 5 depicts an example illustration of the generating suggested keywords according to example embodiments of the present disclosure.

FIG. 5 depicts an example illustration 500 of the generating suggested keywords according to example embodiments of the present disclosure. For example, the system can determine, from a first content provider, a first keyword cluster 510 (e.g., plurality of keywords) associated with a product area. Additionally, the system can determine, from a second content provider, a second keyword cluster 520 associated with the product area. Moreover, the system can determine, from a third content provider, a third keyword cluster associated with the product area. Subsequently, the system can determine, based on the first keyword cluster 510, the second keyword cluster 520, and the third keyword cluster 530, a set of overlapping keywords 540 associated with the product area. The system can store the set of overlapping keywords 540 associated with the product area in the keyword database 120. For example, the first keyword cluster 510 can have 20 similar keywords associated with shoes manufactured from a first merchant, the second keyword cluster can have 15 similar keywords associated with shoes manufactured from a second merchant, and a 10 similar keywords associated with shoes manufactured from a third merchant. The system can determine that five keywords are overlapping (e.g., the same, similar) among the different keyword clusters associated with shoes.

Figure 6A:
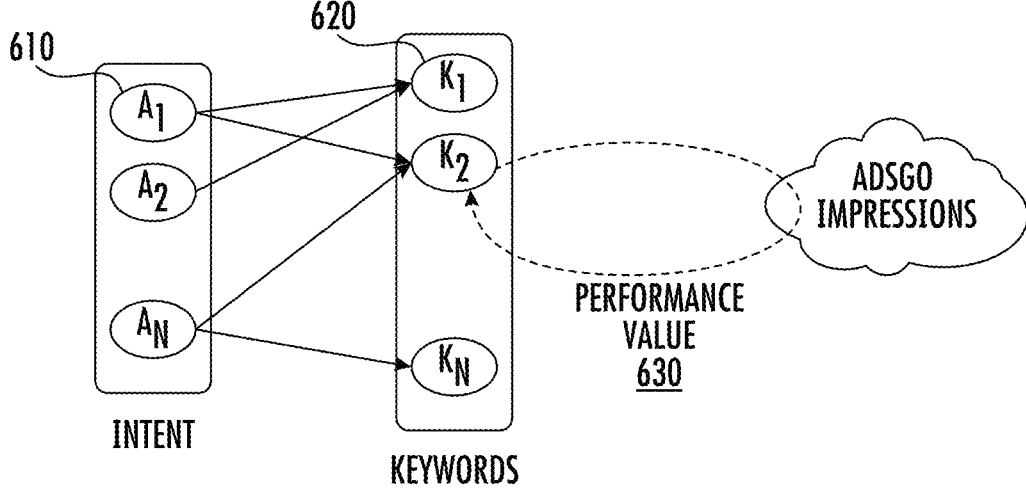
FIGS. 6A-6C depict example illustrations of determining keyword performance value based on keyword clusters and query clusters according to example embodiments of the present disclosure.
Figure 6B:
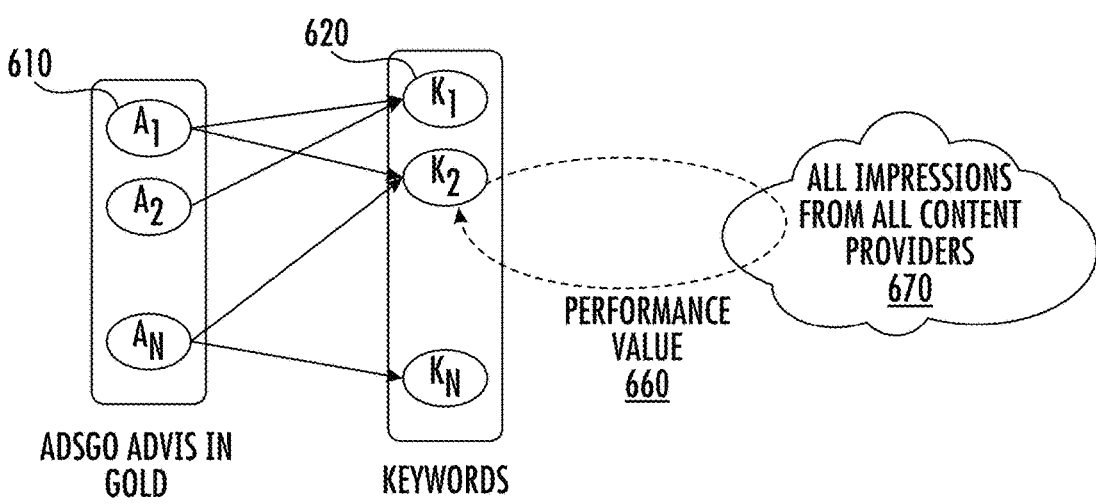
Figure 6C:
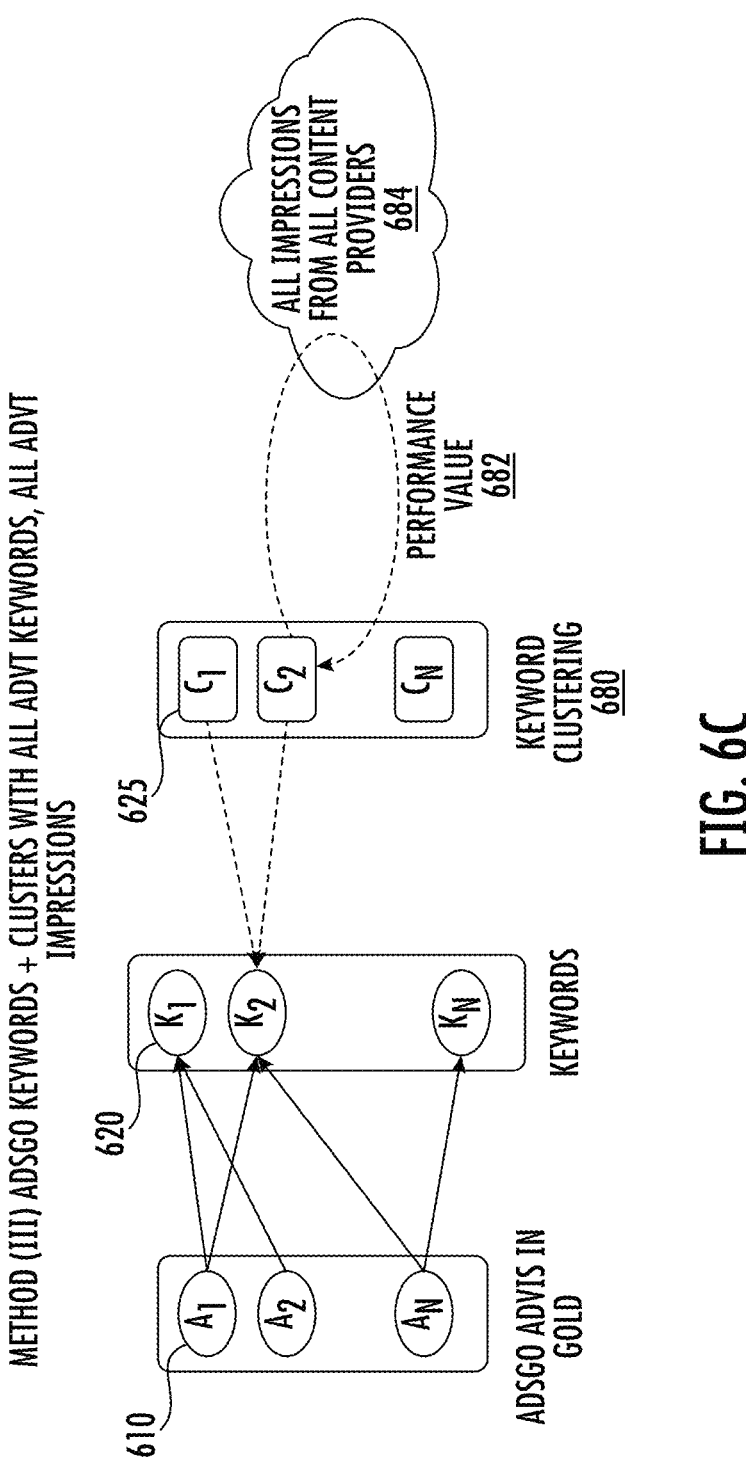

FIGS. 6A-6C depict example illustrations of determining keyword performance value based on keyword clusters and query clusters according to example embodiments of the present disclosure.

In FIG. 6A, in conventional systems, a performance value 630 of a first keyword 620 associated with a first intent 610 can be determined by determining the total biddable conversion of the first keyword 620 by the total valid clicks for the first keyword 620.

In FIG. 6B, in conventional systems, a performance value 660 of a first keyword 620 associated with a first intent 610 can be determined by determining the total biddable conversion of the first keyword 620 in all impressions from all content providers 670 by the total valid clicks for the first keyword 620.

In FIG. 6C, using the techniques described herein, a performance value 682 of a first keyword cluster 625 that is associated with a first keyword 620 that is also associated with a first intent 610. The performance value 682 can be determined by averaging all impressions for the keyword cluster 680. Alternatively, the performance value 682 can be determined by obtaining a maximum value (e.g., associated with the best keyword in the keyword cluster 680) for the conversion to click ratio in the keyword cluster. The system can select the best keyword based on the first keyword 620 in the keyword cluster 625 having the maximum value.

According to some embodiments, the performance value 682 for a given vertical (advt-vert) can be calculated as shown below (kw to denote a keyword, and qclustId to denote a query cluster):

The performance value 682 can be computed:
For each qclustId:
For each kw:
count(kw, qclustId)←#rows (kw, qclustId) impressions.
convs(kw, qclustId)←#conversions for impressions with (kw, qclustId)
clicks(kw, qclustId)←#valid clicks for impressions with (kw, qclustId)
Subsequently, for the Cluster level:
clustmatch_count(qclustId)=sumkwcount(kw, qclustId)
Avg_convperclk(qclustId)=(sumkwconvs(kw, qclustId)/ (sumkwvalid_clicks(kw, qclustId)

Example Methods

FIG. 7 depicts a flow chart diagram of an example method 700 to perform according to example embodiments of the present disclosure. Example method 700 can be implemented by one or more computing systems (e.g., one or more computing systems as discussed with respect to FIGS. 1 to 10C). Although FIG. 7 depicts steps performed in a particular order for purposes of illustration and discussion, the methods of the present disclosure are not limited to the particularly illustrated order or arrangement. The various steps of method 700 can be omitted, rearranged, combined, and/or adapted in various ways without deviating from the scope of the present disclosure.

According to some embodiments, a computing system can include one or more processors and one or more non-transitory computer-readable media. The computer-readable media can collectively store a machine-learned model. The machine-learned model can be configured to generate keywords.

At 702, the computing system can receive, from a user device, a first keyword associated with a content item of a first content provider.

At 704, the computing system can access from a keyword database, a plurality of keywords, the plurality of keywords being obtained from third-party content providers.

At 706, the computing system can select, using the machine-learned model, a subset of keywords from the plurality of keywords based on the content item;

At 708, the computing system can process, using the machine-learned model, the first keyword and a subset of keywords to calculate a similarity score for each keyword in the subset of keywords and the first keyword;

At 710, the computing system can determine a suggested keyword from the subset of keywords based on the similarity score for each keyword in the subset of keywords and the first keyword; and At 712, the computing system can cause, on a display of the user device, a presentation of the suggested keyword.

In some instances, the system can include a keyword database that stores keyword data. The keyword data can include the plurality of keywords. For example, each keyword in the plurality of keywords has been used by a number of third-party content providers that exceeds a threshold value.

In some instances, the system can extract content data from a landing page of the first content provider. The subset of keywords can be further selected from the plurality of keywords based on the content data.

In some instances, the subset of keywords can be further selected from the plurality of keywords based on the first keyword.

In some instances, the similarity score can be calculated using a sum of squared (SQM) nearest-neighbor technique.

In some instances, the similarity score can be calculated using a cosine similarity technique.

In some instances, the similarity score can be calculated using a Jaccard similarity technique.

In some instances, the similarity score can be calculated using a quotient kinematics machines (QKMs) similarity technique.

In some instances, the similarity score can be calculated using a Quantum Bayesianism similarity technique.

In some instances, the similarity score can be calculated based on a number of overlapping keywords, the overlapping keywords being used by both the first content provider and the third-party content providers.

In some instances, the content item can be a product and/or a service.

FIG. 8 depicts a flow chart diagram of an example method 800 to perform according to example embodiments of the present disclosure. Example method 800 can be implemented by one or more computing systems (e.g., one or more computing systems as discussed with respect to FIGS. 1 to 10C). Although FIG. 8 depicts steps performed in a particular order for purposes of illustration and discussion, the methods of the present disclosure are not limited to the particularly illustrated order or arrangement. The various steps of method 800 can be omitted, rearranged, combined, and/or adapted in various ways without deviating from the scope of the present disclosure.

At 802, the computing system can determine, from a first content provider, a first plurality of keywords associated with a product area.

At 804, the computing system can determine, from a second content provider, a second plurality of keywords associated with the product area;

At 806, the computing system can determine, based on the first plurality of keywords and the second plurality of keywords, a set of overlapping keywords associated with the product area; and At 808, the computing system can store, in a keyword database, the set of overlapping keywords associated with the product area.

FIG. 9 depicts a flow chart diagram of an example method 900 to perform according to example embodiments of the present disclosure. Example method 900 can be implemented by one or more computing systems (e.g., one or more computing systems as discussed with respect to FIGS. 1 to 10C). Although FIG. 9 depicts steps performed in a particular order for purposes of illustration and discussion, the methods of the present disclosure are not limited to the particularly illustrated order or arrangement. The various steps of method 900 can be omitted, rearranged, combined, and/or adapted in various ways without deviating from the scope of the present disclosure.

According to some embodiments, a computing system can utilize machine-learned techniques for determining a keyword for a web resource, and automating content presentation for the web resource. The system can include one or more processors and one or more non-transitory computer-readable media that collectively store a keyword database, a machine-learned forecasting model, and instructions. The keyword database can store a plurality of keyword clusters, where a first keyword cluster in the plurality of keyword clusters is associated with a first query cluster that includes a plurality of queries that are semantically similar to a first intent. The machine-learned forecasting model can be configured to forecast keyword performance.

In some instances, the system can include a keyword database that stores a plurality of keyword clusters. The plurality of keyword clusters can include the first keyword cluster. Additionally, each keyword in the first keyword cluster has been used by a number of third-party content providers that exceeds a threshold value (e.g., 50).

At 902, the computing system can receive, from a user device of a first content provider, a request associated with a web resource. The web resource can have a plurality of assets.

In some instances, the request includes a received keyword that is received from the first content provider.

In some instances, the computing system can process, using a machine-learned keyword model, the received keyword and the plurality of assets to generate the first keyword. The first keyword can be different from the received keyword.

In some instances, a return on investment value of the keyword performance metric associated with the first keyword is higher than a return on investment value associated with the received keyword.

At 904, the computing system can determine, based on the plurality of assets, a first keyword associated with the web resource. The first keyword can be associated with the first keyword cluster.

In some instances, the computing system can extract the plurality of assets from the web resource. Additionally, the system can process, using a machine-learned keyword model, the plurality of assets to generate the first keyword.

In some instances, the computing system can process, using a machine-learned keyword model, the first keyword to determine that the first keyword is associated with the first keyword cluster.

In some instances, the first keyword can be determined to be associated with the first query cluster based on the first keyword cluster being associated with the first query cluster.

At 906, the computing system can determine, based on the first keyword cluster, the first keyword being associated with a first query cluster. The first query cluster can have a query performance metric.

In some instances, the computing system can further include a database storing a plurality of query clusters. The plurality of query clusters can include the first query cluster. The first query cluster can be associated with a query performance metric.

In some instances, the query performance metric can be derived from performance of content items that are presented in response to the first intent. In some instances, the content items are associated with content providers that are different from the first content provider.

At 908, the computing system can process, using a machine-learned forecasting model, the first keyword and the first query cluster to generate a keyword performance metric for the first keyword.

In some instances, the keyword performance metric can be generated based on a query performance metric of the first query cluster.

In some instances, the keyword performance metric for the first keyword can include a conversion rate metric for the first keyword.

In some instances, the query performance metric can include a conversion rate for a plurality of queries in the first query cluster. The conversion rate metric for the first keyword can be an average, a median, or a maximum of the conversion rate for the plurality of queries.

In some instances, the first keyword is associated with a second query cluster having a second query performance metric. The keyword performance metric can be calculated by taking a weighted sum of the query performance metric and the second performance metric.

At 910, the computing system can perform an action based on the keyword performance metric associated with the first keyword.

In some instances, the action can include generating a campaign plan for presenting a content item in response to a query associated with the first intent.

In some instances, the action can include a suggestion to modify a bid amount for presenting a content item in response to the first keyword.

In some instances, the computing system can determine, based on the plurality of assets, the first keyword cluster. Additionally, the computing system can determine a return on investment value for each keyword in the first keyword cluster. Moreover, the first keyword can be further determined based on the return on investment value of each keyword in the first keyword cluster.

Example Devices and Systems

Figure 10A:
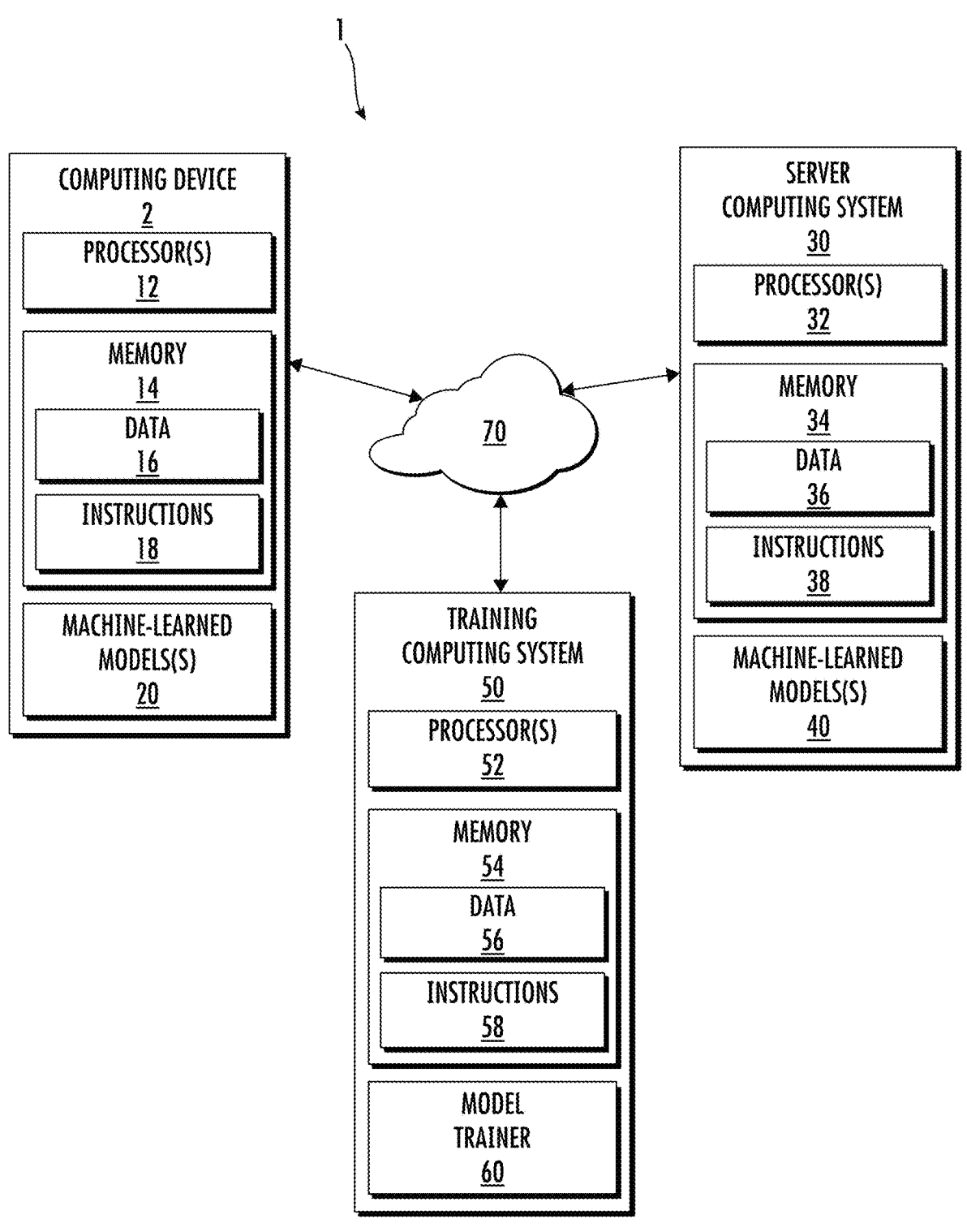
FIG. 10A depicts a block diagram of an example computing system that performs guided content generation according to example embodiments of the present disclosure.

FIG. 10A depicts a block diagram of an example computing system 1 that can perform according to example embodiments of the present disclosure. The system 1 includes a computing device 2, a server computing system 30, and a training computing system 50 that are communicatively coupled over a network 70.

The computing device 2 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to perform operations implementing input data structures and self-consistency output sampling according to example embodiments of the present disclosure, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20.

Additionally, or alternatively, one or more machine-learned models 40 can be included in or otherwise stored and implemented by the server computing system 30 that communicates with the computing device 2 according to a client-server relationship.

Machine-learned model(s) 20 and 40 can include any one or more of the machine-learned models described herein, including the machine-learned asset generation pipeline and any of the component models therein.

The machine-learned models described in this specification may be used in a variety of tasks, applications, and/or use cases. Although described throughout with respect to example implementations for applications in medical domains, it is to be understood that the techniques described herein may be used for other tasks in various technological fields.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a re-clustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some embodiments, the machine-learned models 40 can be implemented by the server computing system 30 as a portion of a web service (e.g., remote machine-learned model hosting service, such as an online interface for performing machine-learned model operations over a network on remote servers 30). For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the computing device 2 is a user endpoint associated with a user account of a campaign generation system. The campaign generation system can operate on the server computing system 30.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations.

In some implementations, the server computing system 30 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 2 or the server computing system 30 can train example embodiments of a machine-learned model (e.g., including models 20 or 40) using a training pipeline (e.g., an unsupervised pipeline, a semi-supervised pipeline, etc.). In some embodiments, the computing device 2 or the server computing system 30 can train example embodiments of a machine-learned model (e.g., including models 20 or 40) using a pre-training pipeline by interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations (e.g., to perform operations implementing input data structures and self-consistency output sampling according to example embodiments of the present disclosure, etc.). In some implementations, the training computing system 50 includes or is otherwise implemented by one or more server computing devices.

The model trainer 60 can include a training pipeline for training machine-learned models using various objectives. Parameters of the image-processing model(s) can be trained, in some embodiments, using various training or learning techniques, such as, for example, backwards propagation of errors. For example, an objective or loss can be back propagated through the pretraining pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pretraining pipeline can perform a number of generalization techniques (e.g., weight decays, dropouts, etc.) to improve the generalization capability of the models being trained.

The model trainer 60 can train one or more machine-learned models 20 or 40 using training data (e.g., data 56). The training data can include, for example, historical performance data, past user interactions, and/or past campaigns.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 10A illustrates one example computing system that can be used to implement the present disclosure. Other computing systems can be used as well. For example, in some implementations, the computing device 2 can include the model trainer 60. In some implementations, the computing device 2 can implement the model trainer 60 to personalize the model(s) based on device-specific data.

Figure 10B:
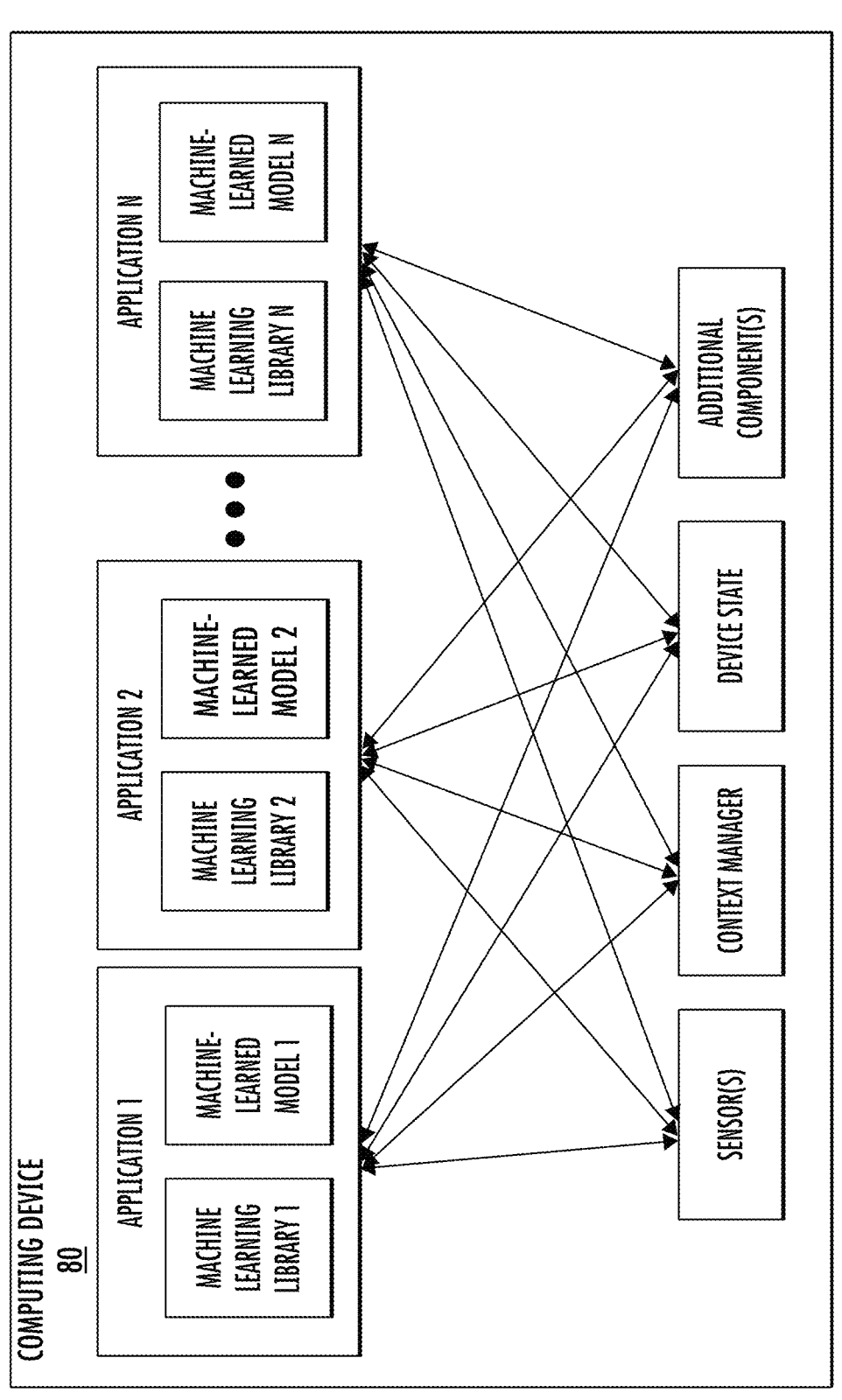
FIG. 10B depicts a block diagram of an example computing device that performs guided content generation according to example embodiments of the present disclosure.

FIG. 10B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 10B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 10C:
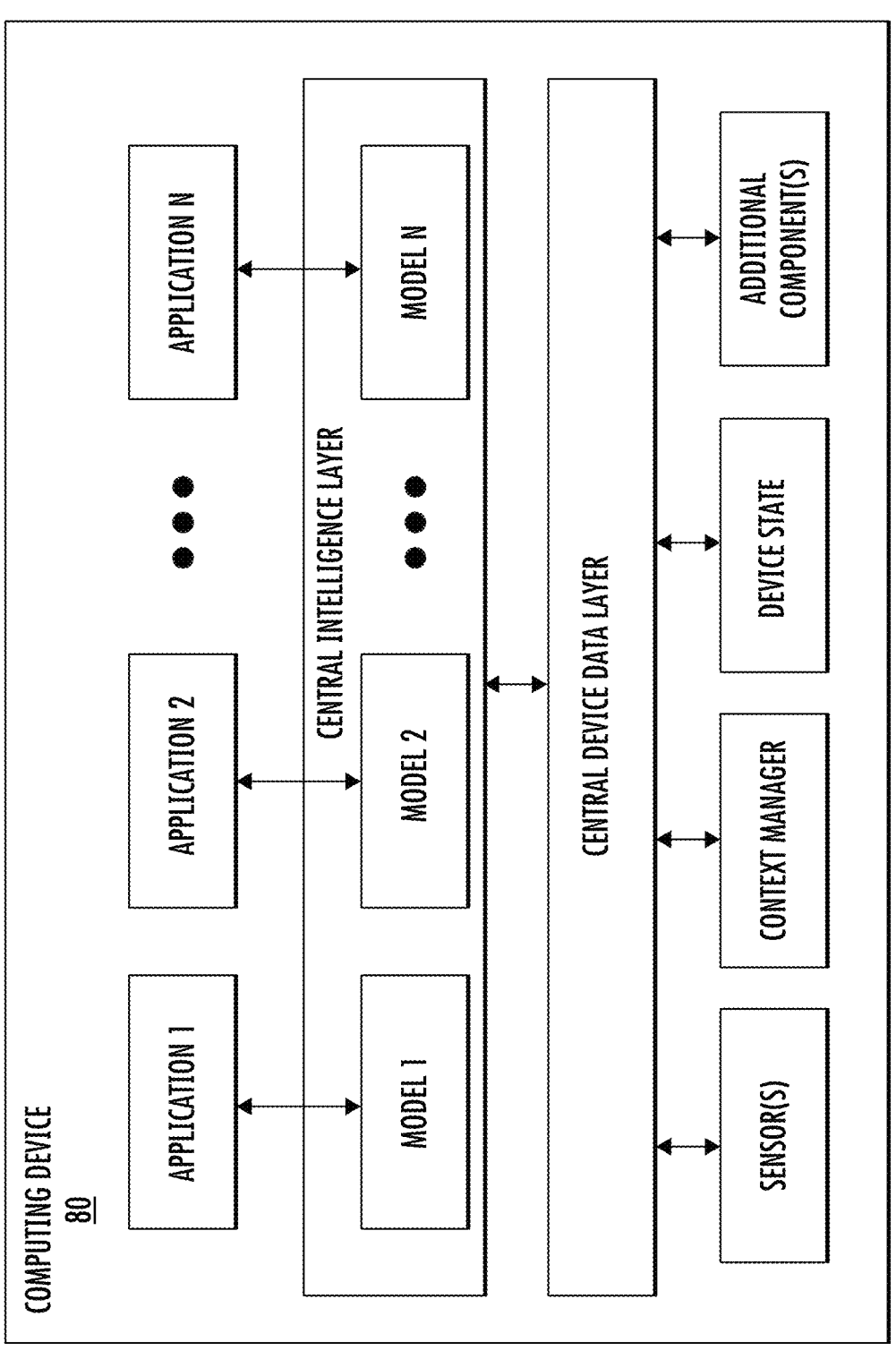
FIG. 10C depicts a block diagram of an example computing device that performs guided content generation according to example embodiments of the present disclosure.

FIG. 10C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 10C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 10C, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example of how implementations can operate or be configured is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of," "any combination of" example elements listed therein, etc. Also, terms such as "based on" should be understood as "based at least in part on."

What is claimed is:

1. A computing system, comprising:
one or more processors; and
one or more non-transitory computer-readable media that collectively store:
a machine-learned model configured to generate keywords; and
instructions that, when executed by the one or more processors, cause the computing system to perform operations, the operations comprising:
extracting a plurality of assets from a landing page of a first content provider:
processing, using a machine-learned keyword model, the content data to generate a first keyword associated with a content item of the first content provider;
accessing from a keyword database, a plurality of keywords, the plurality of keywords being obtained from third-party content providers;
extracting content data from the landing page of the first content provider;
selecting, using the machine-learned model, a subset of keywords from the plurality of keywords based on the content item and the content data;
processing, using the machine-learned model, the first keyword and a subset of keywords to calculate a similarity score for each keyword in the subset of keywords and the first keyword;
determining a suggested keyword from the subset of keywords based on the similarity score for each keyword in the subset of keywords and the first keyword;
causing, on a display of the user device, a presentation of the suggested keyword; and
updating a parameter of the machine-learned model based on feedback received in response to the presentation of the suggested keyword, wherein the outputs of the machine-learned model are optimized based on the feedback.

2. The computing system of claim 1, further comprising:
the keyword database that stores keyword data, wherein the keyword data includes the plurality of keywords.

3. The computing system of claim 2, wherein each keyword in the plurality of keywords has been used by a number of third-party content providers that exceeds a threshold value.

4. The computing system of claim 1, wherein the subset of keywords is further selected from the plurality of keywords based on the first keyword.

5. The computing system of claim 1, wherein the similarity score is calculated using a sum of squared (SQM) nearest-neighbor technique.

6. The computing system of claim 1, wherein the similarity score is calculated using a cosine similarity technique.

7. The computing system of claim 1, wherein the similarity score is calculated using a Jaccard similarity technique.

8. The computing system of claim 1, wherein the similarity score is calculated using a quotient kinematics machines (QKMs) similarity technique.

9. The computing system of claim 1, wherein the similarity score is calculated using a Quantum Bayesianism similarity technique.

10. The computing system of claim 1, wherein the similarity score is calculated based on a number of overlapping keywords, the overlapping keywords being used by both the first content provider and the third-party content providers.

11. The computing system of claim 1, wherein the content item is a product.

12. The computing system of claim 1, wherein the content item is a service.

13. The computing system of claim 1, the operation further comprising:
determining a return on investment value for each keyword in the subset of keywords,
wherein the suggested keyword is further determined based on the return on investment value of each keyword in the subset of keywords.

14. A computer-implemented method, comprising:
extracting a plurality of assets from a landing page of a first content provider;
processing, using a machine-learned keyword model, the content data to generate a first keyword associated with a content item of the first content provider;
accessing from a keyword database, a plurality of keywords, the plurality of keywords being obtained from third-party content providers;
extracting content data from the landing page of the first content provider;
selecting, using the machine-learned model, a subset of keywords from the plurality of keywords based on the content item and the content data;
processing, using the machine-learned model, the first keyword and a subset of keywords to calculate a similarity score for each keyword in the subset of keywords and the first keyword;
determining a suggested keyword from the subset of keywords based on the similarity score for each keyword in the subset of keywords and the first keyword;
causing, on a display of the user device, a presentation of the suggested keyword; and
updating a parameter of the machine-learned model based on feedback received in response to the presentation of the suggested keyword, wherein the outputs of the machine-learned model are optimized based on the feedback.

15. The method of claim 14, further comprising:
storing the plurality of keywords in a keyword database, wherein each keyword in the plurality of keywords has been used by a number of third-party content providers that exceeds a threshold value.

16. The method of claim 14, wherein similarity score is calculated using a sum of squared (SQM) nearest-neighbor technique, a cosine similarity technique, a Jaccard similarity technique, a quotient kinematics machines (QKMs) similarity technique, or a Quantum Bayesianism similarity technique.

17. The method of claim 14, further comprising:
determining, from a first content provider, a first plurality of keywords associated with a product area;
determining, from a second content provider, a second plurality of keywords associated with the product area;

determining, based on the first plurality of keywords and the second plurality of keywords, a set of overlapping keywords associated with the product area;

storing, in a keyword database, the set of overlapping keywords associated with the product area, wherein the subset of keywords is selected from the overlapping keywords.

18. One or more non-transitory, computer readable media storing instructions that are executable by one or more processors to cause a computing system to perform operations, the operations comprising:

extracting a plurality of assets from a landing page of a first content provider;

processing, using a machine-learned keyword model, the content data to generate a first keyword associated with a content item of the first content provider;

accessing from a keyword database, a plurality of keywords, the plurality of keywords being obtained from third-party content providers;

extracting content data from the landing page of the first content provider;

selecting, using the machine-learned model, a subset of keywords from the plurality of keywords based on the content item and the content data;

processing, using the machine-learned model, the first keyword and a subset of keywords to calculate a similarity score for each keyword in the subset of keywords and the first keyword;

determining a suggested keyword from the subset of keywords based on the similarity score for each keyword in the subset of keywords and the first keyword;

causing, on a display of the user device, a presentation of the suggested keyword; and updating a parameter of the machine-learned model based on feedback received in response to the presentation of the suggested keyword, wherein the outputs of the machine-learned model are optimized based on the feedback.

19. The computing system of claim 1, wherein the feedback is a selection of the suggested keywork, a confirmation of the selected keyword, or an approval of the selected keywork.

* * * * *